April 9, 1935. E. T. ABENDROTH 1,997,029
FEED OR WATER TROUGH
Filed Oct. 2, 1933
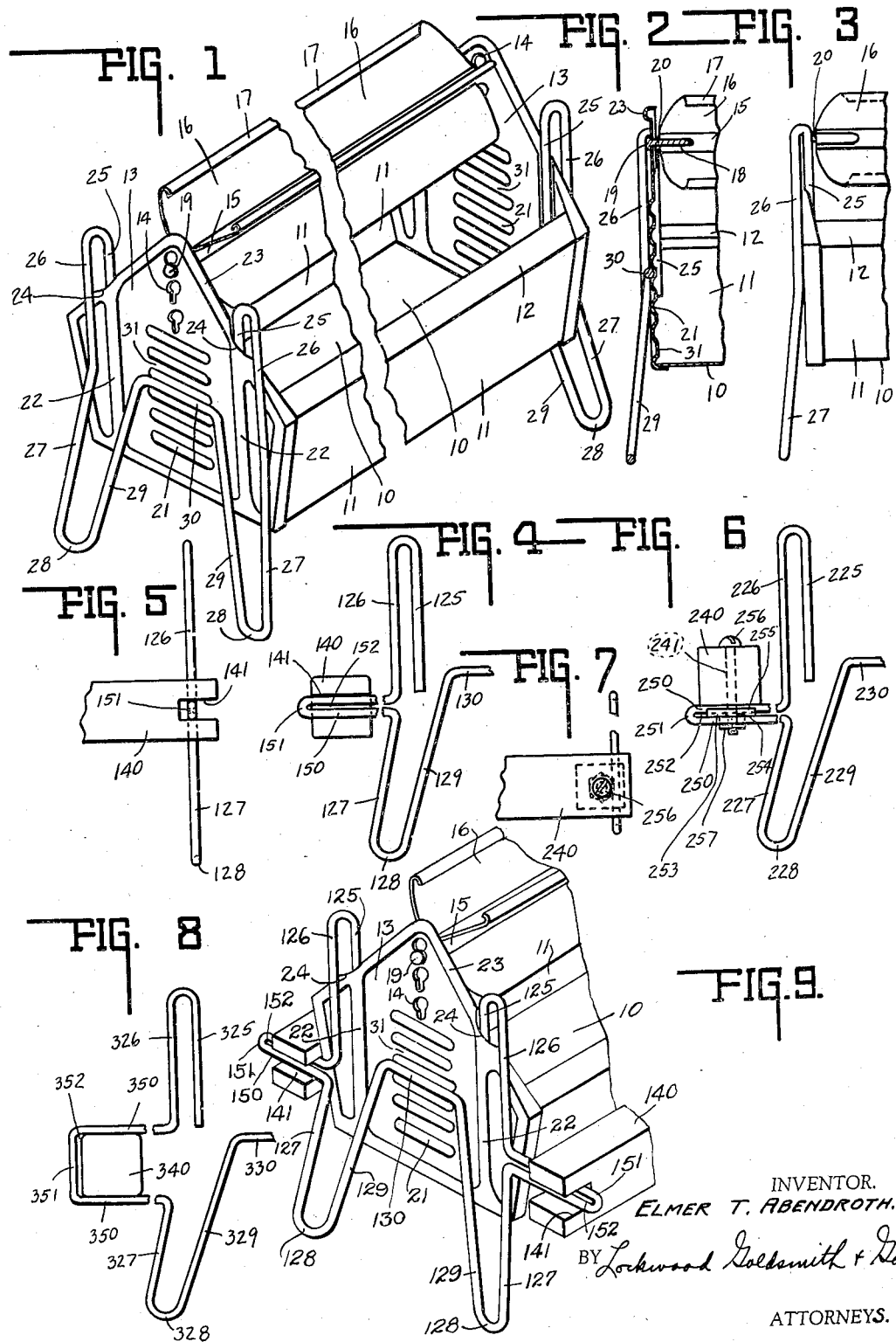
INVENTOR.
ELMER T. ABENDROTH.
BY Lockwood Goldsmith & Galt
ATTORNEYS.

Patented Apr. 9, 1935

1,997,029

UNITED STATES PATENT OFFICE 1,997,029

FEED OR WATER TROUGH

Elmer T. Abendroth, Tipton, Ind., assignor to The Oakes Manufacturing Company, Inc., Tipton, Ind., a corporation Application October 2, 1933, Serial No. 691,775

13 Claims. (Cl. 119—61)

This invention relates to a chick feeder, and particularly the construction thereof.

The chief object of the invention is to provide a chick feeder whereby parts are relatively adjustable for positioning the feeder at various levels above the support so that the feeder may be progressively elevated as the chicks grow.

Another object of the invention is to provide the parts of the feeder with a detachable coopcrating connection, whereby the several parts may be readily knocked down and shipped in the knock-down and readily assembled for use.

Another object of the invention is to provide a support, such as a perch, for the chicks adjacent the feeder and so associate the same with the feeder that the distance from the perch to the trough edge is increased as the chicks grow.

The chief feature of the invention consists in the construction and arrangement of the respective parts, whereby the aforesaid objects are accomplished.

Another feature of the invention consists in the perch support being formed as a unitary portion of the adjustable support for the feeding trough whereby a single adjustment simultaneously adjusts the position of the trough relative to the support and correspondingly adjusts the position of the perch with reference to the trough.

Another feature of the invention consists in the formation of the trough support as a single unitary element, preferably formed of a single wire of wire stock.

The full nature of the invention will be understood from the accompanying drawing and the following description and claims:

Fig. 1 is a perspective view, with intermediate portions broken away, of an elongated chick trough from which the perch is omitted. Fig. 2 is a central sectional view of one end of the trough, reel and end frame. Fig. 3 is a side elevation of one end of the said parts. Fig. 4 is an end elevation of one-half of an end frame associated with a perch, the other half being identical therewith or of a character shown in Fig. 1, as desired. Fig. 5 is a side elevation of the end portion of the perch shown in Fig. 4 and the cooperating portions of the end frame. Fig. 6 is a view of a modified form of the invention and is similar to Fig. 4. Fig. 7 is a top plan view of the end of the perch shown in Fig. 6 and the associated portion of the end frame. Fig. 8 is a view similar to Figs. 4 and 6 and is a still further modified form of the invention embodying the perch. Fig. 9 is a perspective view of one end of the trough showing the perch mounted upon the end frame as illustrated in Figs. 4 and 5.

In the drawing, 10 indicates the bottom of the trough for feeding chicks and the like, 11 the upwardly and outwardly directed opposite sides, 12 the lips defining the mouth of the trough, and 13 generally indicates the ends of the trough, all of the aforesaid comprising a unitary structure.

The ends of the trough are extended upwardly and are provided with a plurality of superposed slots herein shown as a key hole type of slot 14.

A reel provides a central portion 15 and four diverging wings 16, each provided with a longitudinal curled edge 17. The central portion mounts a stud 18 having a head 19 and an exposed bearing portion 20. The head 19 is receivable or passable through the enlarged portion of the key hole slot 14 and the bearing portion 20 seats in the narrow portion of said slot. In this manner the reel may be adjustably mounted with respect to the mouth of the trough. When the chicks are little, the lowermost aligned pair of key hole slots receive the reel and rotatably support the same. As the chicks grow, the reel is progressively elevated until the maximum elevation is obtained.

The reel not only serves as a guard to prevent the chicks from toppling into the trough, but also prevents the chicks from flying into the trough. If the chicks attempt to perch on the reel, the same is so arranged that they will engage one of the curled edges 17 with their feet and this causes an unbalancing and rotation of the reel, which tosses the chick from the trough and back to the supporting surface.

Since each end of the feeding trough, considering the same as a unit, is identical, the remainder of the description will be confined to a single end of trough construction. Each end 13 of the trough includes in superposed relation and immediately beneath the key hole slots, a plurality of superposed parallel and horizontal corrugations 21. Each end of the trough also includes two vertical corrugations adjacent each side edge of the end. These are indicated by the numerals 22. The upper portion of the end is defined by a corrugated or bead-like arrangement 23 which is cut out as at 24 where the same registers with the upper end of the vertical corrugations 22. This permits the passage of the downwardly directed ends 25 of the end frame. There are two downwardly directed ends 25 and these are adapted to nest in the vertical corrugations 22 of each trough end and lie within the trough. Each end 25 has a return bend portion 26 that lies immediately outside of the trough and thus there is a clamping association obtained between the end frame and the trough end since in the initial formation of the end frame, which is preferably of wire stock, the portions 26 and 25 are formed to lie within a common plane, but when mounted upon the trough end are caused to move from said common plane, the ends moving in one direction and the return bend portions 26 remaining in the said plane for the clamping mounting of the end frame upon the end.

Each return bend 26, as shown in Figs. 1 to 3, inclusive, is extended angularly of the common plane, as indicated in Figs. 2 and 3, and is extended outwardly, as shown clearly in Fig. 1. This portion is indicated by the numeral 27. The lower end of portion 27 terminates in the U-shaped base portion 28, the other arm of which extends upwardly and inwardly toward the trough end, said portion being indicated by the numeral 29. The two inwardly and upwardly directed portions 29 are suitably connected by a horizontally-disposed portion 30. The spacing between the corrugations 21 is such as to form a series of superposed grooves in each of which the intermediate connecting portion 30 is adapted to nest, and thus retain the end frame in the adjusted position. It will be apparent also that by reason of the length of the vertical corrugation 22 and the end 25 that sufficient accommodation is provided for clamping connection of the end frame for all positions that the end frame may assume when the same is forcibly positioned with the intermediate portion 30 in any one of the grooves indicated by the numeral 31 formed between corrugations 21. It will also be apparent from an examination of Figs. 1, 2 and 3, that the end frame supports are directed slightly outwardly from the ends of the trough and are directed outwardly to a considerable extent from the sides of the trough so that a relatively wide base effect is obtained which is of greater area than the projected area of the trough itself, thereby insuring stability of the trough and preventing the chicks from over-turning it.

The invention heretofore has been described in its simplest form, with the exception, of course, of the addition of the reel. Naturally when no reel is desired to be utilized, it may be readily detached from the trough and temporarily or permanently discarded. It will also be noted that the reel, the end frames and the trough may be so associated together as to be shipped in the knock-down and readily assembled by the purchaser of the trough.

Heretofore in this industry, it has sometimes been the practice to provide a perch adjacent the trough. This perch is in spaced relation to the trough so that the chicks can perch thereon and feed from the trough. The present invention also contemplates the provision of a support for a perch, if only one is desired, or for two perches, one on each side of the trough, whenever opposite side feeding from the trough is desired. Various forms of this modification are illustrated in Figs. 4 to 8, inclusive. It is to be understood that the perch employed is substantially of the same length as the trough.

In Figs. 4 and 5, 140 indicates the perch which herein is shown provided with an end slot 141. Similar parts of the end frame, of which only half is illustrated in Fig. 4, are indicated by similar numerals of the 100 series. Extending outwardly or sidewardly from the end frame and at each side, somewhere about the junction between the portions 126 and 127 is a U-shaped return bend extension 150 having the projecting end portion 151 and if desired the gap 152 therebetween. These portions 150 may or may not be parallel. Preferably they would be slightly divergent from the portion 151 so that when the notched end of the perch is forced thereon a relatively tight clamping connection is obtained, thereby retaining the perch on its outwardly projecting support of U-shape character.

In Figs. 6 and 7 a modified form of the invention is illustrated and in said figures numerals of the 200 series indicate similar parts. The perch is indicated by the numeral 240 and is provided with a vertical opening 241 therethrough. The end frame is provided with an outwardly or sidewardly directed U-shaped extension 250 which has the midportion 251 and appreciable gap or spacing 252 between the arms thereof. An angular plate 253 is apertured as at 254 and the side 255 bears against the side of one of the arms 250. The aperture 254 is in registration with the aperture 241 and a bolt 256 extends through said apertures and mounts a nut 257, whereby the end of the perch is suitably secured to the end frame.

In Fig. 8 the modified form of the invention illustrated is of a similar character and the parts bear numerals of the 300 series. In this form of the invention the perch 340 is slidably received in the gap 352 between the two spaced arms 350 connected by the midportion 351 of the U-shape outwardly or sidewardly directed extension of the end frame.

In each form of the invention providing a perch support integral with the end frame, it will be noted that there is utilized the U-shaped lateral extension of the end frame.

It will also be observed that when an adjustment is made between the end frame and the end of the trough, the trough being elevated or lowered, the top of the perch is correspondingly spaced a greater or lesser distance from the lip 12 of said trough so that as the chicks grow and as the trough is elevated, when a perch is employed, the perch is increasingly spaced from the mouth of the trough and in a single adjustment of the end frame in respect to the end of the trough. While the invention has been set forth in considerable detail hereinbefore and the various modifications thereof have been illustrated and described, the same is to be considered as illustrative and not restrictive in character, and such modifications, which will suggest themselves to a person skilled in this art, are all considered to be within the broad scope of this invention, reference being had to the appended claims.

The invention claimed is:

1. In combination, a trough end and an end frame for a chick feeding trough, said trough end including a plurality of substantially parallel spaced grooves and said end frame including a pair of substantially parallel inverted U-shaped portions and a midportion transverse to the U-shaped portions and connected thereto, said trough end having a plurality of parallel grooves substantially transverse to the first-mentioned pair of parallel grooves, the midportion and one of each of the arms of the inverted U-shaped portion being receivable by one of the second-mentioned grooves and one of the first-mentioned parallel grooves respectively for adjustably and clampingly associating the end frame with the trough end.

2. In combination, a trough end and an end frame for a chick feeding trough, said trough end including a plurality of substantially parallel spaced grooves and said end frame including a pair of substantially parallel inverted U-shaped portions and a midportion transverse to the U-shaped portions and connected thereto, said trough end having a plurality of parallel grooves substantially transverse to the first-mentioned pair of parallel grooves, the midportion and one of each of the arms of the inverted U-shaped portion being receivable by one of the second-mentioned grooves and one of the first-mentioned parallel grooves respectively for adjustably and clampingly associating the end frame with the trough end, said end frame including a pair of U-shaped base portions each connected to the before-mentioned midportion at one end and to the inverted U-shaped portion at the outer end.

3. In combination, a trough end and an end frame for a chick feeding trough, said trough end including a plurality of substantially parallel spaced grooves and said end frame including a pair of substantially parallel inverted U-shaped portions and a midportion transverse to the U-shaped portions and connected thereto, said trough end having a plurality of parallel grooves substantially transverse to the first-mentioned pair of parallel grooves, the midportion and one of each of the arms of the inverted U-shaped portion being receivable by one of the second-mentioned grooves and one of the first-mentioned parallel grooves respectively for adjustably and clampingly associating the end frame with the trough end, a perch in spaced relation to the trough and coextensive with the length thereof and terminating adjacent the end of the trough, and means extending outwardly from the end frame and operatively associated with the perch end for supporting the same in said spaced relation to the trough.

4. In combination, a trough end and an end frame for a chick feeding trough, said trough end including a plurality of substantially parallel spaced grooves and said end frame including a pair of substantially parallel inverted U-shaped portions and a midportion transverse to the U-shaped portions and connected thereto, said trough end having a plurality of parallel grooves substantially transverse to the first-mentioned pair of parallel grooves, the midportion and one of each of the arms of the inverted U-shaped portion being receivable by one of the second-mentioned grooves and one of the first-mentioned parallel grooves respectively for adjustably and clampingly associating the end frame with the trough end, said end frame including a pair of U-shaped trough supporting portions each connected to the before-mentioned midportion at one end and to the inverted U-shaped portion at the outer end, a perch in spaced relation to the trough and coextensive with the length thereof and terminating adjacent the end of the trough, and means extending outwardly from the end frame and operatively associated with the perch end for supporting the same in said spaced relation to the trough.

5. In combination, a trough end and an end frame for a chick feeding trough, said trough end including a plurality of substantially parallel spaced grooves and said end frame including a pair of substantially parallel inverted U-shaped portions and a midportion transverse to the U-shaped portions and connected thereto, said trough end having a plurality of parallel grooves substantially transverse to the first-mentioned pair of parallel grooves, the midportion and one of each of the arms of the inverted U-shaped portion being receivable by one of the second-mentioned grooves and one of the first-mentioned parallel grooves respectively for adjustably and clampingly associating the end frame with the trough end, a perch in spaced relation to the trough and coextensive with the length thereof and terminating adjacent the end of the trough, and means extending outwardly from the end frame and operatively associated with the perch end for supporting the same in said spaced relation to the trough, said outwardly directed portion including a return bend portion.

6. In combination, a trough end and an end frame for a chick feeding trough, said trough end including a plurality of substantially parallel spaced grooves and said end frame including a pair of substantially parallel inverted U-shaped portions and a midportion transverse to the U-shaped portions and connected thereto, said trough end having a plurality of parallel grooves substantially transverse to the first-mentioned pair of parallel grooves, the midportion and one of each of the arms of the inverted U-shaped portion being receivable by one of the second-mentioned grooves and one of the first-mentioned parallel grooves respectively for adjustably and clampingly associating the end frame with the trough end, said end frame including a pair of U-shaped trough supporting portions each connected to the before-mentioned midportion at one end and to the inverted U-shaped portion at the outer end, a perch in spaced relation to the trough and coextensive with the length thereof and terminating adjacent the end of the trough, and means extending outwardly from the end frame and operatively associated with the perch end for supporting the same in said spaced relation to the trough, said outwardly directed portion including a return bend portion.

7. In combination, a trough end and an end frame for a chick feeding trough, said trough end including a plurality of substantially parallel spaced grooves and said end frame including a pair of substantially parallel inverted U-shaped portions and a midportion transverse to the U-shaped portions and connected thereto, said trough end having a plurality of parallel grooves substantially transverse to the first-mentioned pair of parallel grooves, the midportion and one of each of the arms of the inverted U-shaped portion being receivable by one of the second-mentioned grooves and one of the first-mentioned parallel grooves respectively for adjustably and clampingly associating the end frame with the trough end, a perch in spaced relation to the trough and coextensive with the length thereof and terminating adjacent the end of the trough, and means extending outwardly from the end frame and operatively associated with the perch end for supporting the same in said spaced relation to the trough, said outwardly directed portion including a return bend portion and said cooperating connection between said return bend portion and the end of the perch including a slot arrangement.

8. In combination, a trough end and an end frame for a chick feeding trough, said trough end including a plurality of substantially parallel spaced grooves and said end frame including a pair of substantially parallel inverted U-shaped portions and a midportion transverse to the U-shaped portions and connected thereto, said trough end having a plurality of parallel grooves substantially transverse to the first-mentioned pair of parallel grooves, the midportion and one of each of the arms of the inverted U-shaped portion being receivable by one of the second-mentioned grooves and one of the first-mentioned parallel grooves respectively for adjustably and clampingly associating the end frame with the trough end, said end frame including a pair of U-shaped trough supporting portions each connected to the before-mentioned midportion at one end and to the inverted U-shaped portion at the outer end, a perch in spaced relation to the trough and coextensive with the length thereof and terminating adjacent the end of the trough, and means extending outwardly from the end frame and operatively associated with the perch end for supporting the same in said spaced relation to the trough, said outwardly directed portion including a return bend portion and said cooperating connection between said return bend portion and the end of the perch including a slot arrangement.

9. In combination, a trough end and an end frame for a chick feeding trough, said trough end being formed of sheet metal and said end frame being formed of wire, said wire end frame being bent to provide a pair of supporting legs for supporting the trough in elevated position, and gripping portions formed on said end frame for embracing and gripping the sheet metal trough end, whereby said trough may be supported thereby in adjusted position.

10. In combination, a sheet metal trough end and an end frame of wire for a chick feeding trough, said wire end frame being bent to provide oppositely-disposed legs for supporting said trough in elevated position, an intermediate portion for engaging the outer surface of the sheet metal trough end, and end portions for engaging the opposite side of said trough end whereby said end frame may be removably clamped in adjusted position.

11. In combination, a chick feeding trough having a pair of sheet metal ends and wire supporting frames for supporting said trough in elevated position, said supporting frames being adapted to embrace and clamp the sheet metal ends of the trough so as to be removable therefrom and adjustable for varying the elevation of the trough.

12. In combination, a trough end and an end frame for a chick feeding trough, said end frame including a pair of substantially parallel inverted U-shape portions embracing and engaging opposite surfaces of the trough end for adjustably and clampingly associating the end frame therewith.

13. In combination, a chick feeding trough having a pair of sheet metal ends and wire supporting frames for supporting said trough in elevated position, said supporting frames being adapted to embrace and clamp the sheet metal ends of the trough so as to be removable therefrom and adjustable for varying the elevation of the trough, said frames each having an outwardly extending support, and a perch supported thereby in spaced relation to the trough and substantially coextensive with the length thereof.

ELMER T. ABENDROTH.